United States Patent [19]

Payne

[11] Patent Number: 4,509,634

[45] Date of Patent: Apr. 9, 1985

[54] BUFFER STORAGE APPARATUS

[75] Inventor: Kenneth G. Payne, Chislehurst, England

[73] Assignee: Sasib S.p.A., Bologna, Italy

[21] Appl. No.: 337,483

[22] Filed: Jan. 6, 1982

[30] Foreign Application Priority Data

Jan. 12, 1981 [GB] United Kingdom ................. 8100840

[51] Int. Cl.$^3$ ................................................. B65G 1/00
[52] U.S. Cl. ..................................... 198/347; 198/750
[58] Field of Search ...................... 198/347, 750, 438; 131/107, 282, 283, 909

[56] References Cited

U.S. PATENT DOCUMENTS

| | | | |
|---|---|---|---|
| 1,925,502 | 9/1933 | Schaeffer | 198/750 |
| 3,782,523 | 1/1974 | Giatti | 198/347 |
| 3,795,304 | 3/1974 | Poundstone | 198/750 |
| 3,952,854 | 4/1976 | Selonke | 198/347 |
| 4,089,439 | 5/1978 | Dearlove et al. | 198/750 |
| 4,120,391 | 10/1978 | Molins et al. | 198/347 |
| 4,220,236 | 9/1980 | Blidung et al. | 198/347 |
| 4,254,858 | 3/1981 | Seragnoli | 198/347 |
| 4,344,445 | 8/1982 | Seragnoli | 198/347 |
| 4,366,895 | 1/1983 | Bennet et al. | 198/347 |

FOREIGN PATENT DOCUMENTS

| | | | |
|---|---|---|---|
| 2652363 | 5/1978 | Fed. Rep. of Germany | 198/347 |
| 1218598 | 1/1971 | United Kingdom | 198/347 |

Primary Examiner—Joseph E. Valenza
Assistant Examiner—Kyle E. Shane
Attorney, Agent, or Firm—Spencer & Frank

[57] ABSTRACT

A buffer storage apparatus includes a mechanism for removing a product travelling from one location to another, and an elongate reservoir belt movable in the direction of its elongation from a stowed position wound on a spool, past the removing mechanism to receive the product and thereafter to a product storage position where the charged reservoir belt is wound on a further spool. When the reservoir belt is being wound round one spool the reservoir is being unwound from the other. The reservoir belt itself is preferably provided with pockets or dividers which, apart from separating the articles, serve as spacers between layers of wound belt and thus eliminate the possibility of articles being compressed between layers of conveyor belt wound round the loaded conveyor spool/drum. The system is designed to handle a variety of sizes and shapes of articles such as rectangular products like chocolate bars or cigarette packages, bottles, cylindrical or rod-shaped articles such as cigarettes, tin cans, etc.

7 Claims, 20 Drawing Figures

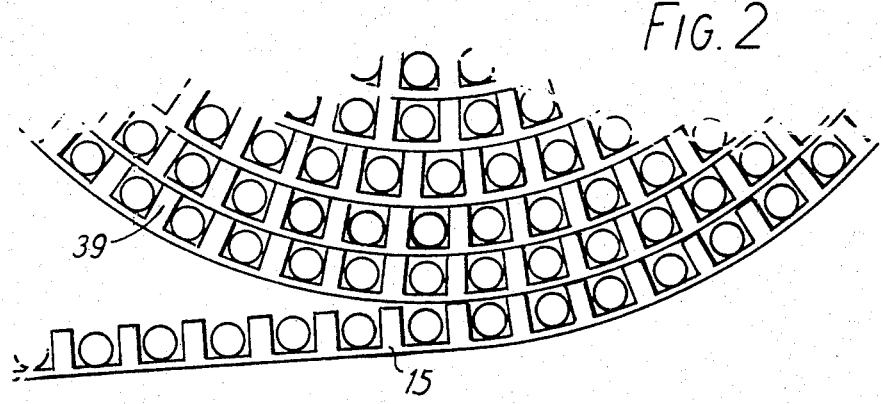
FIG. 2
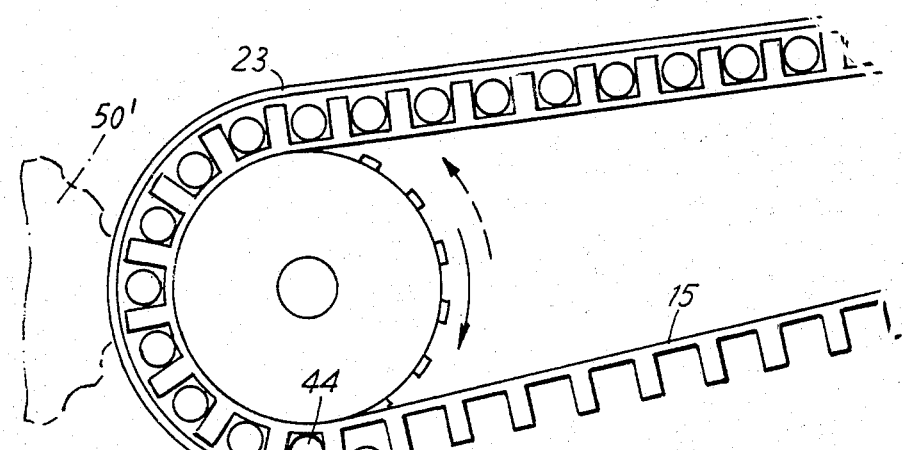
FIG. 3
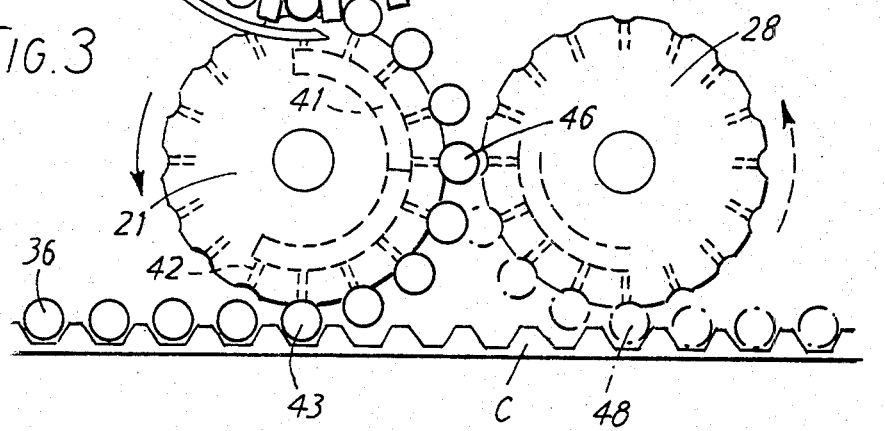

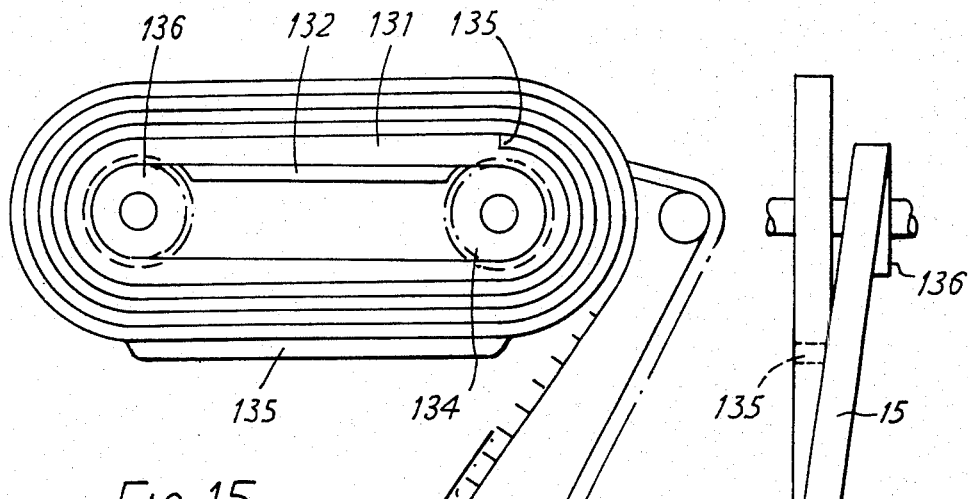
FIG. 15
FIG. 16
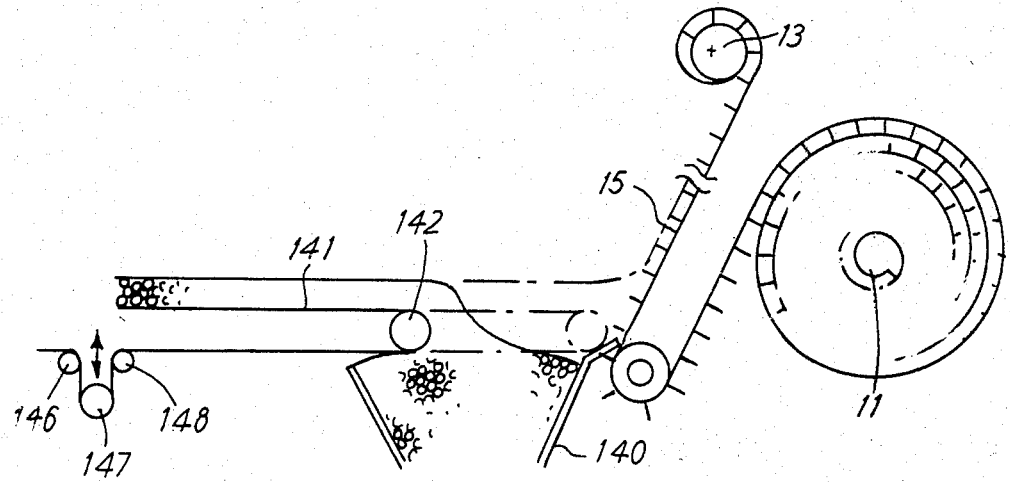
FIG. 17

BUFFER STORAGE APPARATUS

BACKGROUND TO THE INVENTION

The present invention relates to a limited capacity buffer storage reservoir which may be used between two stages of a manufacturing procedure or process linked together by means of a conveyor belt or the like, including means for diverting, holding and drawing articles, singly or in bulk.

Where two stages of a manufacturing procedure or process are carried out on two separate machines linked in such a fashion, it is desirable to draw products off the direct link system if the second stage or unit of manufacture (down line) stops for any reason, thus enabling the first unit to continue operating. Conversely, if the first unit stops the second unit may continue operating if articles are introduced to the direct link conveyor.

The retrieval and feeding of articles from and to such conveyors may be carried out manually, with semi or fully automatic equipment. Articles removed from conveyors are placed into containers and, if need be, taken away to storage areas. Later they are returned to the feeding point and loaded onto the direct link system. Other, containerless, systems employ by-pass conveyors of varying lengths travelling over distances in straight lines, with returns, alongside or in tiers. Some are arranged at processing machine level, others are elevated and use combinations of horizontal, vertical and semi-circular lengths of conveyor, in the main storing articles on lengths arranged horizontally. Articles, products, etc, are supported singly, in layers or in bulk, with or without the aid of additional chamber-like side members.

SUMMARY OF THE INVENTION

According to the invention the buffer storage apparatus comprises means for removing a product travelling from one location to another, and an elongate reservoir movable in the direction of its elongation from a stowed position, past the removing means to receive the product and thereafter to a product storage position. Preferably the reservoir is stowed on a first core from which it is drawn when buffer storage is required, and is taken up on a second core in the product storage position, i.e., the reservoir is coiled about the first core and is coiled about said second core as the reservoir is drawn off the first core, the product being enclosed between the turns of the reservoir on the second core.

This invention differs from other conveyor-based storage systems in that a long length of reservoir belt made for this purpose may be installed immediately above the point at which articles have to be removed from a direct link conveyor and returned thereto, thus requiring little or no additional floor space. Two or more storage belts may be used side by side, thus increasing total storage capacity. The reservoir may comprise a storage belt which, when loaded, is stored or contained in a small area by being wound or coiled around itself, thus not requiring additional static supporting structures. This system consists, basically, of two spool-like drums, with or without side flanges, normally mounted one above the other, around which a length of reservoir belt is wound or coiled. One spool is employed to take up 'loaded' portions of a reservoir belt and the other 'empty' belt. When the reservoir belt is being wound round one spool the reservoir is being unwound from the other. The reservoir belt itself is preferably provided with pockets or dividers which, apart from acting as means for separating articles, serve as spacers between layers of wound belt, thus eliminating the possibility of articles being compressed between layers of reservoir belt wound round the loaded reservoir conveyor spool/drum. The system is designed to handle a variety of sizes and shapes of articles, such as rectangular products like chocolate bars or cigarette packages, bottles, and cylindrical or rod-shaped articles like cigarettes, tin cans. etc.

BRIEF DESCRIPTION OF THE DRAWINGS

The invention will now be described by way of example with reference to the accompanying drawings, in which:

FIG. 2 is a partial elevational view of the coiled elongate reservoir belt containing cigarettes;

FIG. 3 is a partial elevational view of the pick-up and delivery drums and reservoir belt;

FIG. 15 is a modified form of the system shown in FIG. 1 in which the elongated reservoir is supplied from and taken up on endless tracks;

FIG. 16 is an end elevational view showing the reservoir belt and endless tracks only; and FIG. 17 is an elevational view of a further buffer system for cigarettes.

DESCRIPTION OF PREFERRED EMBODIMENT

Figure 1:
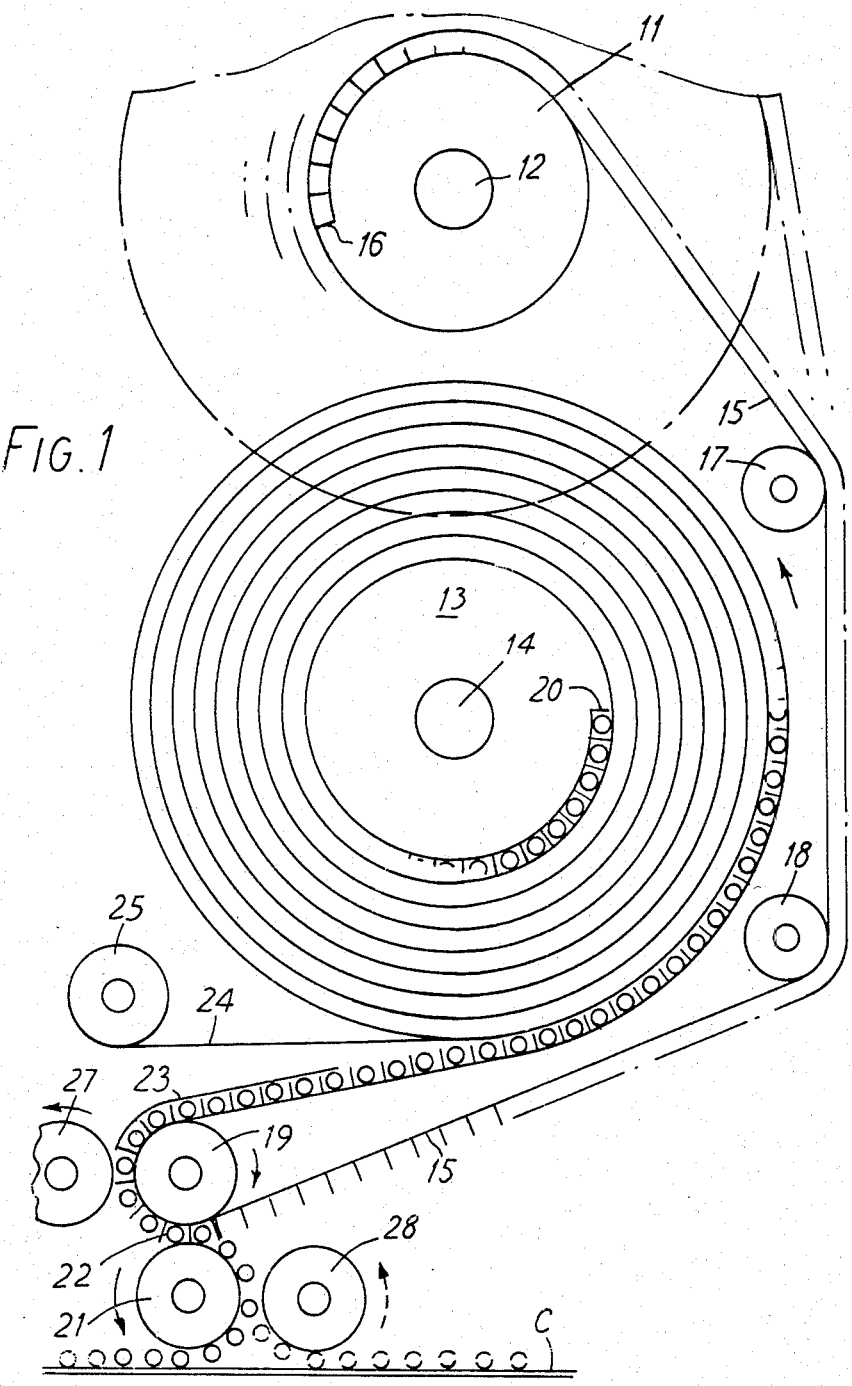
FIG. 1 is a schematic elevational view of the buffer storage apparatus arranged above a conveyor feeding cigarettes from a maker to a packer.

The preferred or basic arrangement for the buffer storage apparatus (see FIGS. 1 and 2) comprises an empty or 'take up' drum 11 mounted on a drive shaft 12 which in turn is supported by lateral members (not illustrated) on one or both sides of the drum. These members may rise from the ground, may be affixed to processing machinery or their direct linking conveyor systems, or hung from above. Below or to the side of the empty conveyor drum is a loaded belt drum 13 also mounted on a drive shaft 14 and supported by lateral members. The drum shafts are rotated by variable speed, reversible, electric motors actuated by suitable electronic controls designed to keep the reservoir belt under constant and uniform tension. One end of a reservoir belt 15 is affixed to the drum 11 at a shoulder 16 and passes downwards around the outside of idler wheels 17 and 18, beneath drum 13, and under and around a belt return wheel 19 (which may be driven). The other end of the reservoir belt 15 is affixed to the drum 13 at shoulder 20.

The two drums 11 and 13, the idler wheels 17 and 18, and wheel 19 are disposed above a conveyor belt or band C which conveys cigarettes from a maker to a packer (not shown). The wheel 19 is positioned directly over a fluted pick-up drum 21 which, when activated (i.e., when suction is applied in a manner well known in the art), picks up the cigarettes from the conveyor band C and passes them via a transfer drum 27 to the reservoir belt 15. For the purpose of returning the cigarettes to the conveyor band a further fluted drum 28 is provided which cooperates with the pick up drum 21 on reversal of the latter.

The idler wheels 17 and 18 may revolve freely or may be provided with variable speed motors for improved tension control. The return wheel 19 is also provided with a reversible drive motor, or mechanical gearing to synchronize the rate of rotation to that of the pick up drum 21 feeding articles to point 22 on wheel 19.

In operation should the packer be stopped the buffer storage apparatus is actuated, whereupon cigarettes are picked up and transferred by the fluted drum 21 to the belt 15 at point 22, after which the cigarettes and belt are wrapped up together with the on the drum 13. The maker therefore does not stop. As soon as the packer recommences operation the buffer storage apparatus ceases to operate and retains the cigarettes fed to it during packer stoppage. Should the maker stop for any reason the buffer storage apparatus will once again operate but in the reverse directions, thereby feeding cigarettes from the reservoir belt 15 to the conveyor band C.

The reservoir belt drum 13 is shown fully wound. When the reservoir belt is commanded to unload articles, drum 13 rotates in a clockwise direction and gradually reduces in diameter. In turn, take-up drum 11 rotates in a counter-clockwise direction, gradually increasing in diameter. If required, the loaded reservoir belt may be provided with support from below by a straight, or gradually curving, member (see FIG. 9) which is raised and lowered.

Figure 4:
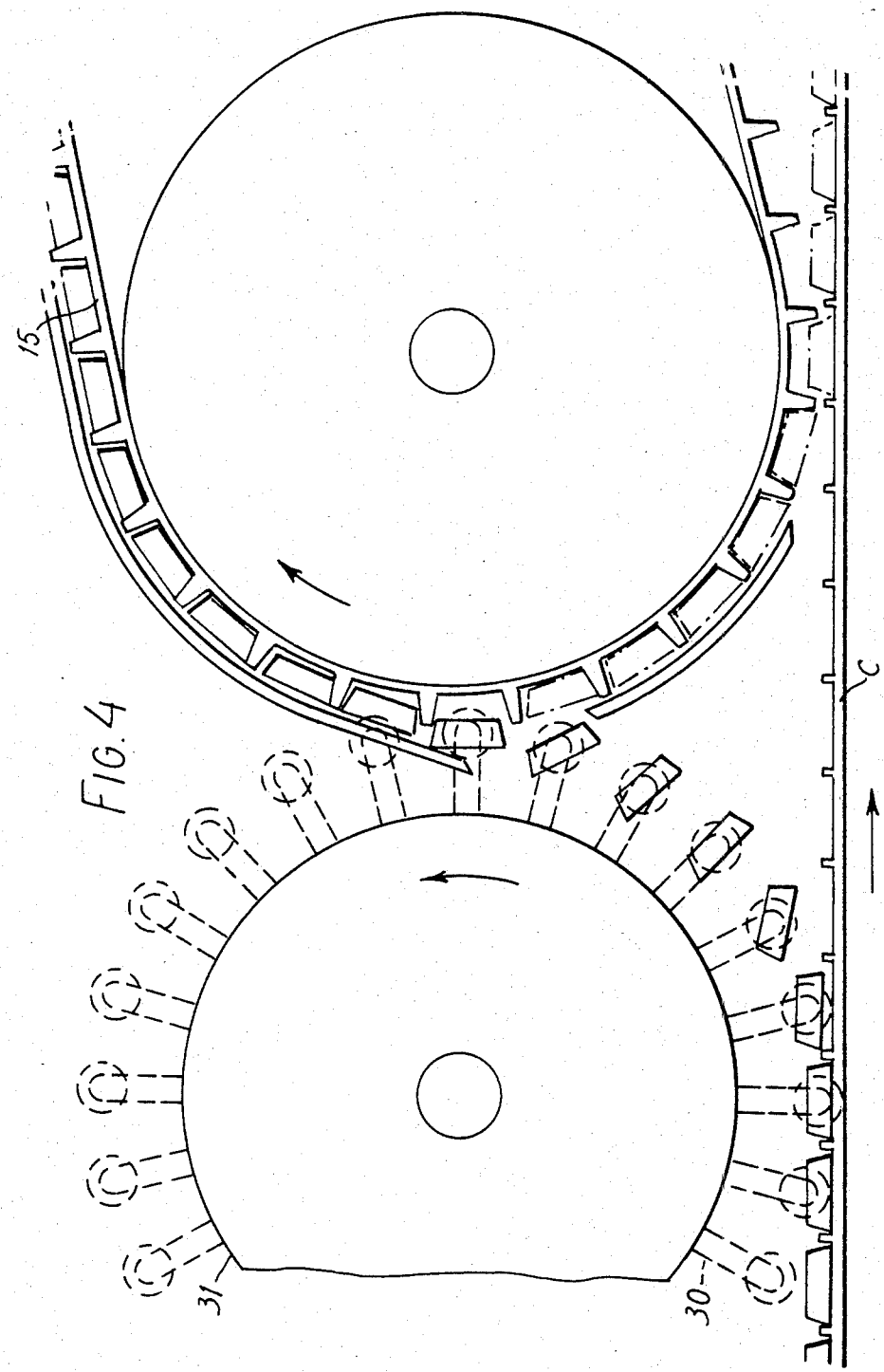
FIG. 4 is a partial elevational view of a further embodiment in which the system is designed to convey packages (e.g. chocolate bars as shown)

A variety of divider patterns for the reservoir belt may be used. Whereas FIGS. 1 and 2 illustrate apparatus suitable for rod shaped articles such as cigarettes, the arrangement of FIG. 4 is for rectangular box-shaped articles such as chocolates. In the latter construction the articles are picked up by a series of arms 30 extending radially from a pick up drum 31. The articles are transferred to the reservoir belt 15 and, in order to orientate the articles for return, grippers at the ends of the arms 30 are arranged to rotate by means well known. The rectangular shaped objects are thereby transferred to the reservoir belt in a fashion that ensures that, when returned to the direct link conveyor, they are still face upwards. In this arrangement articles are rotated 180° between the time they are picked off the direct link conveyor and transferred to belt 15. When articles are being conveyed directly between two stages of manufacture the wheel 19 is raised sufficiently to allow free passage of the articles on the conveyor band or, the conveyor band itself is lowered.

Figure 8A:
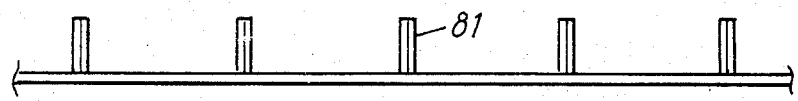
FIGS. 8a and 8b show elevational and plan views of a reservoir belt suitable for the system of FIG. 7.
Figure 8B:
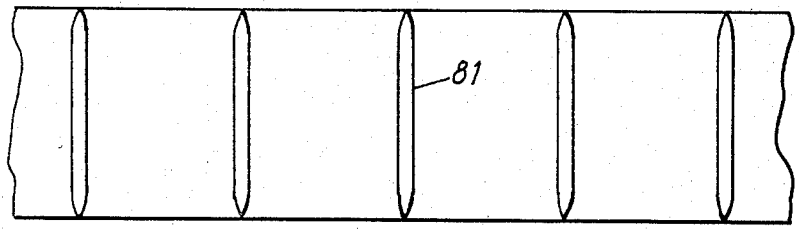
Figure 10A:
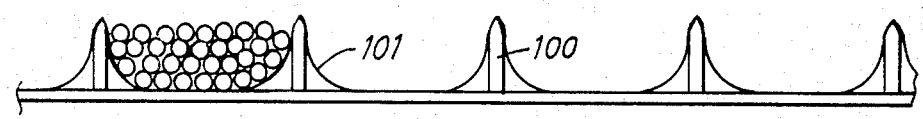
FIGS. 10a and 10b show elevational and plan views of a reservoir belt suitable for the system of FIG. 9 and other embodiments.
Figure 10B:
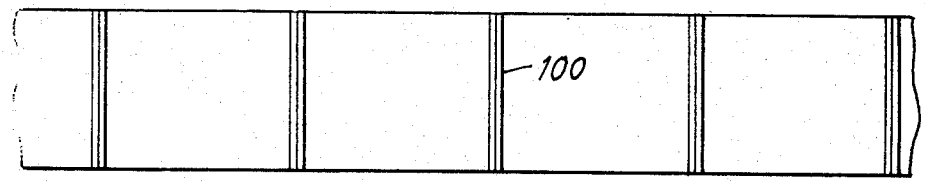
Figure 11:
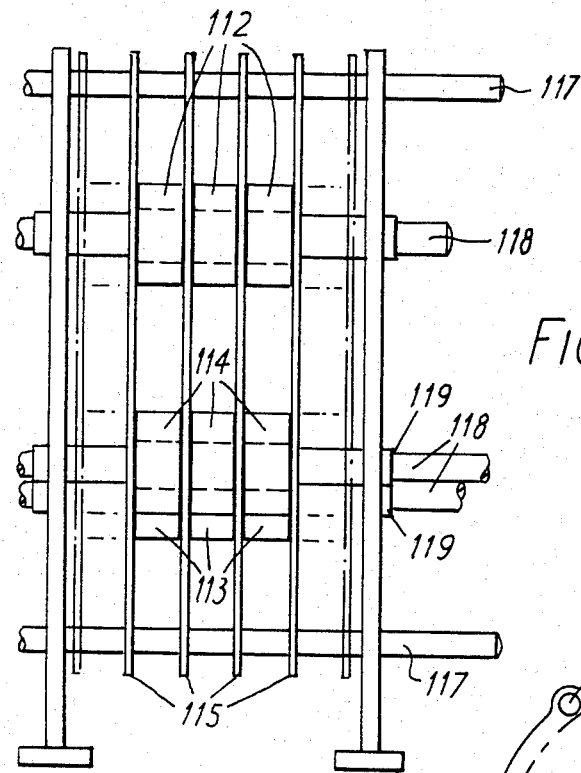
FIG. 11 is an end elevational view of a buffer system in which two or more sets of reservoir belts (not shown) and drums and related equipment are arranged side by side.

The arrangements shown in FIGS. 8 and 10 are designed to accommodate rod-shaped articles in bulk. Articles having other shapes may be carried or contained, singly or in bulk, as illustrated, or the reservoir belt may be altered to suit objects having other or irregular shapes.

Articles being carried upwards to the loaded reservoir belt drum 13 (FIG. 1) are held in place by gravity. However, as an additional precaution wires, bars or plates may be fitted (see guide 23 in FIG. 1). Once articles reach the point on the drum where the belt starts to wind they are contained in place by the reverse face of the belt already wound on the drum. Articles are prevented from being compressed by reservoir belt dividers 39 (FIG. 2). Additional protection may be provided by feeding a web of flexible material 24 FIG. 1) between layers of belt wound round the drum, the end of this interleaf web being fixed at the shoulder 20 (FIG. 1). The interleaf web is fed from a reel 25 provided with a winding motor and appropriate control (not shown).

Articles being transported by direct link conveyor between two manufacturing stages or processes may be diverted to the buffer system by a number of means. FIG. 3 illustrates rod shaped products 36 being transferred by the drum 21 to the reservoir belt 15 travelling around the return wheel 19. The drum 21 is provided with internal vacuum chambers 41 actuated in such a fashion that articles adhere to suction ports 42 at point 43 and are released at point 44. At this point the articles are transferred to the reservoir belt 15 and are held in place by a stationary wires or plates 23. When the reservoir belt is required to return articles to the direct link conveyor they are transferred at point 44, held by suction to point 46, transferred to suction drum 28 and released at point 48. Alternatively, where the first stage of manufacture is fitted with a delivery suction drum 50' (shown in clain lines), the suction drums 21 and 28 may be dispensed with, the transfer of articles to the direct link conveyor taking place at point 44.

Figure 5:
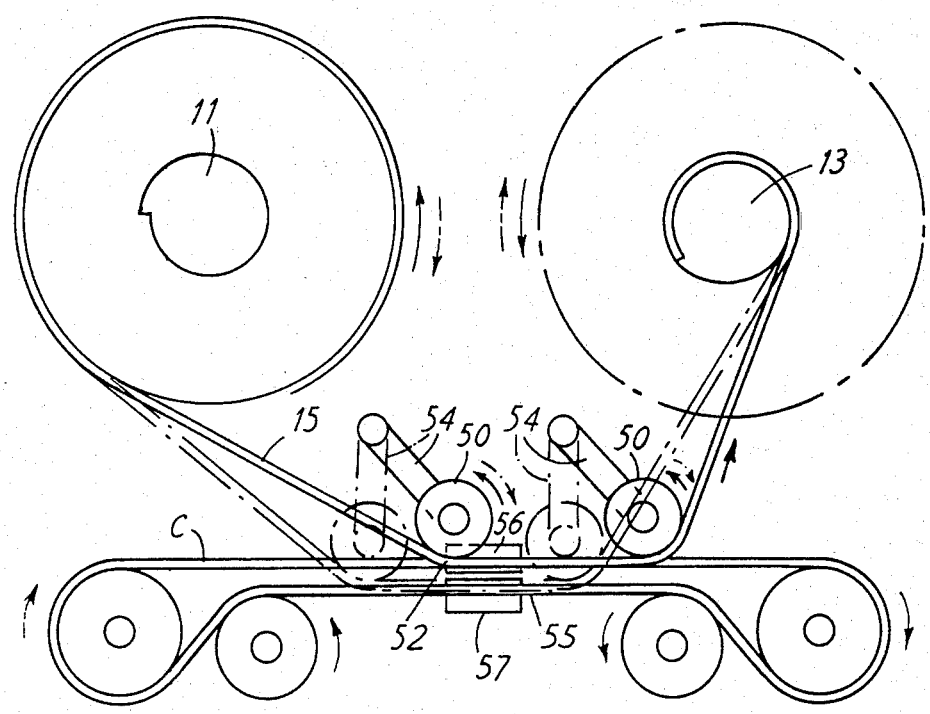
FIG. 5 shows another buffer system in which the product is moved laterally of the conveyor to the reservoir belt.
Figure 6A:
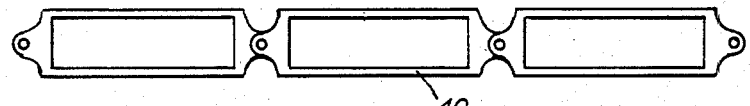
FIGS. 6a and 6b show elevational and plan views of a linked reservoir belt suitable for the system shown in FIG. 5.
Figure 6B:
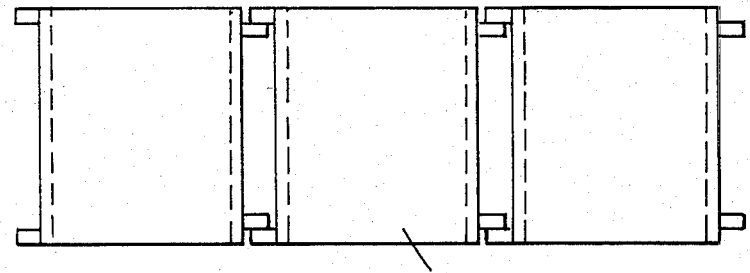

FIG. 5 illustrates a system where articles are being conveyed in pockets on a direct link conveyor C. The reservoir belt of the arrangement of FIG. 5 (but also of any other example) may comprise links 49 capable of containing multiples of rod shaped articles or single rectangular products (see FIGS. 6a and 6b).

When articles reach the run 52 of the belt 15 they are transferred by pushers represented schematically at 56 into the pockets in the reservoir belt 15 and taken to the loaded reservoir drum 13. When returning articles to the direct link conveyor, the belt 15, shown in interrupted lines, is lowered by wheels 50 on levers 54 so that the run 52 coincides with the direct link conveyor band at point 55 and articles are transferred by pushers 57.

Figure 7:
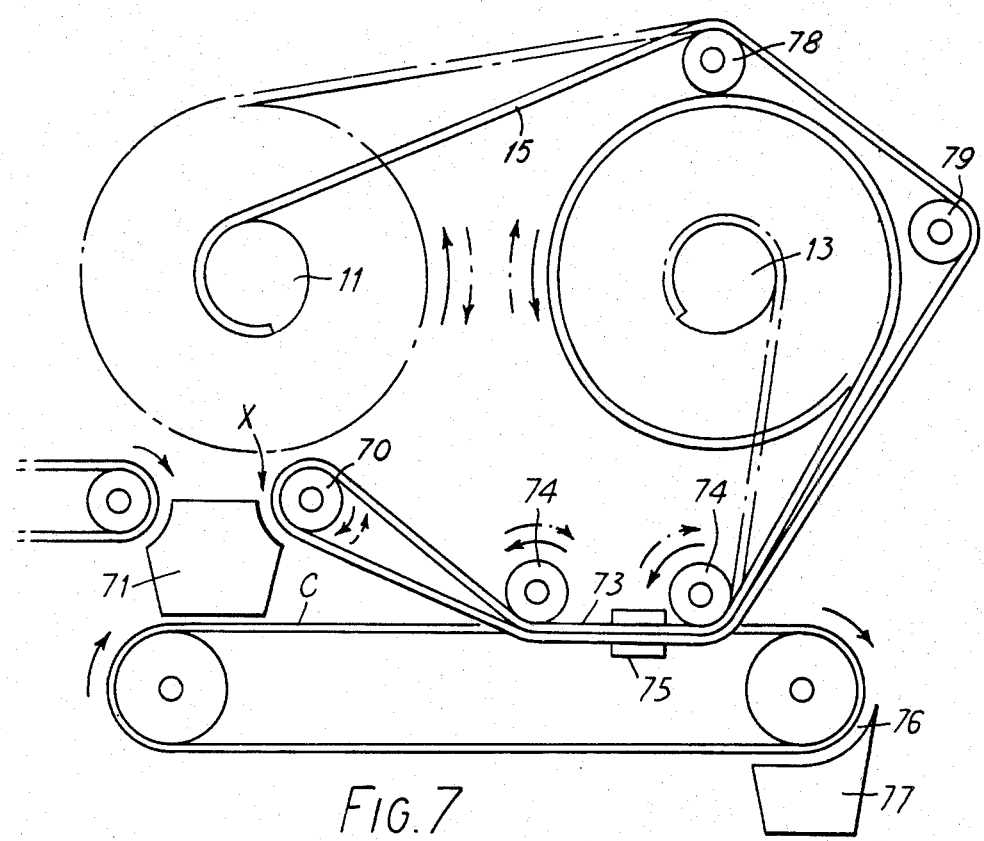
FIG. 7 shows an arrangement for handling a bulk product.

Another arrangement of the storage buffer is shown in FIG. 7, in which products are discharged into an intermediate hopper 71 and then released onto a direct link conveyor band C. The reservoir belt 15 is drawn off the drum 11 and passes over idler rollers 78 and 79 to a run 73, between rollers 74, aligned with the conveyor band C. The articles are transferred sideways into the reservoir belt 15 and taken up to the loaded belt drum 13. When required to return the articles, the reservoir belt 15 is reversed thus returning the articles around wheel 70 to the hopper 71 at point X. From there the products are discharged onto the conveyor band C at point 76 where they are discharged into hopper 77.

FIG. 8 illustrate a suitable reservoir belt with upright dividers 81, the leading edges of which are shaped in a manner to prevent articles from colliding, or jamming, at the moment of transfer.

Figure 9:
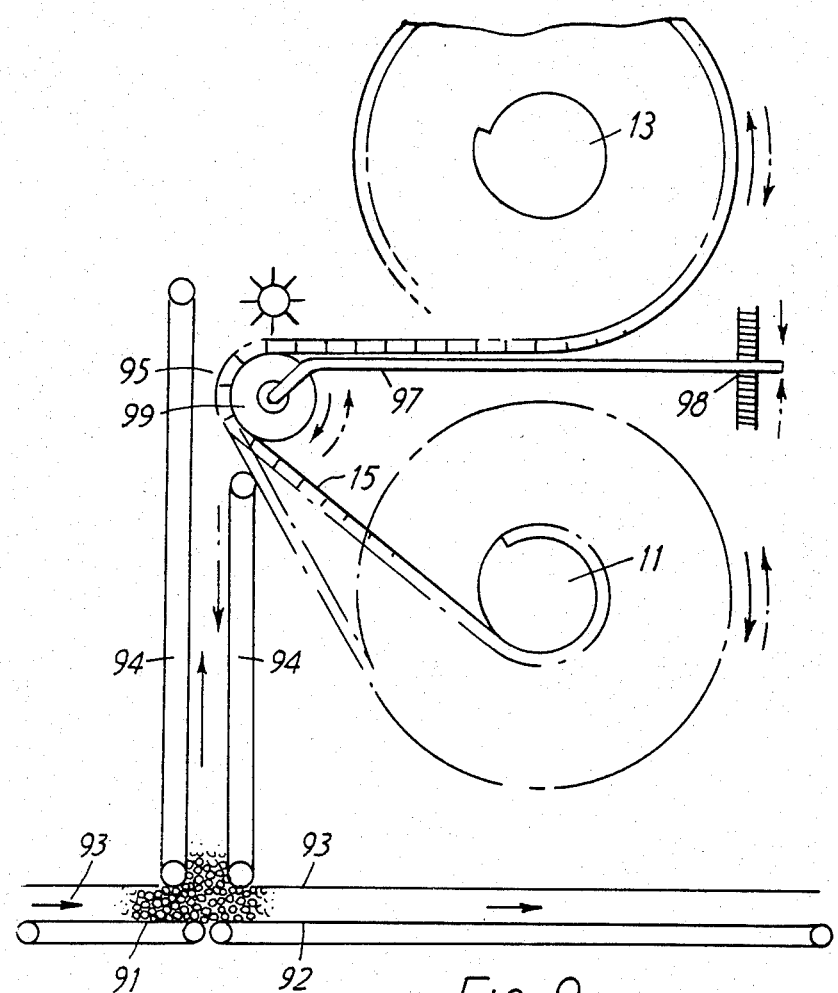
FIG. 9 is an elevational view of another embodiment for handling a bulk product.

In the example of FIG. 9 the products are conveyed between bands 91, 92 and plates 93. The reservoir belt 15 is accomodated as described above on two drums 11, 13. When articles are to be loaded or diverted to the reservoir belt 15 the band 92 stops and the articles are routed upwards between bands 94 and are transferred to reservoir belt pockets travelling around drum 99 at point 95. A limited drum 96 with flaps or bushes regulates the quantity of articles to be carried in the pockets of the reservoir belt 15. To return articles to the direct link conveyor 91, 92 the system is reversed, band 91 stopping and band 92 starting. To minimise compression of articles in the storage belt as it is wound round the loaded reservoir drum, the reservoir belt 15 may be fitted with portions 100 and flexible hammock-like pieces of material 101 (FIG. 10) which deform towards the corners of the pockets as the belt curves.

The reservoir belt 15 may be supported by a pivoted guide 97 raised and lowered by mechanism 98.

Figure 12:
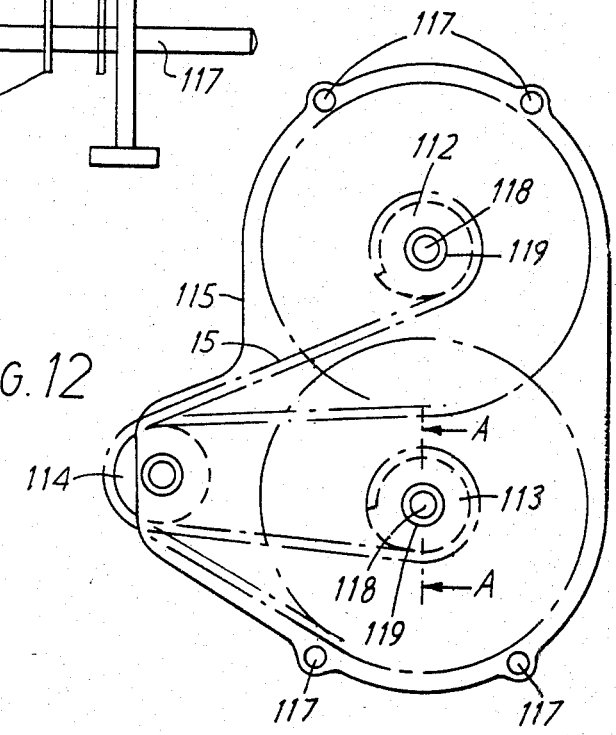
FIG. 12 is a side elevational view of the system shown in FIG. 11.
Figure 13:
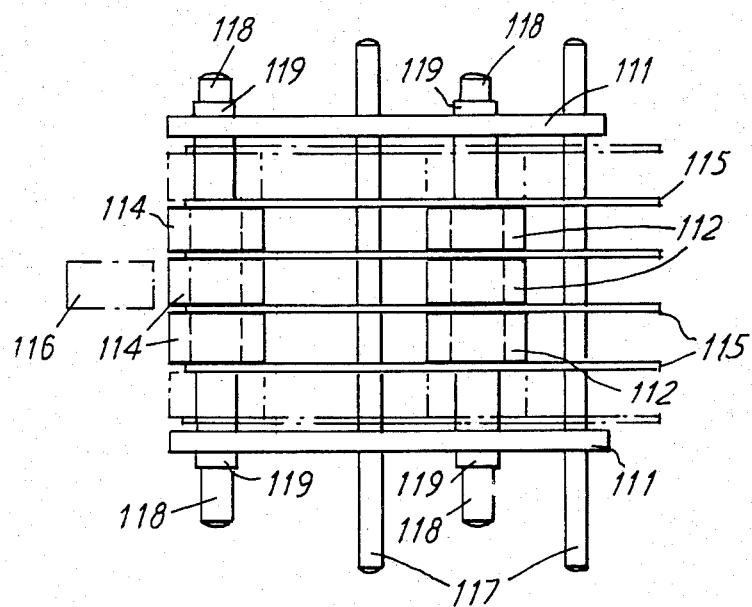
FIG. 13 is a plan view of the system shown in FIG. 11.
Figure 14:
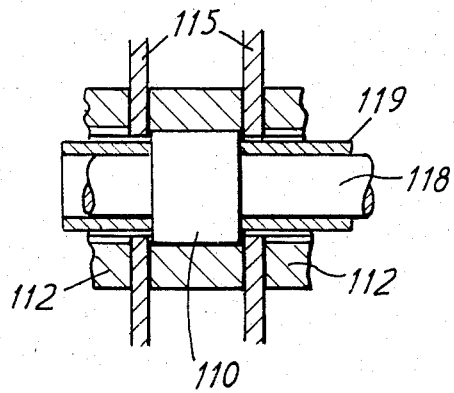
FIG. 14 is a sectional view taken along the line A—A in FIG. 12, on an enlarged scale.

In FIGS. 11, 12, 13 and 14 two or more sets of storage and take-up drums and other related equipment are shown installed side by side, and for the sake of clarity reservoir belt 15 is only shown in FIG. 12. Vertical side frames 111, mounted on the floor, on machinery or from above the direct link system between two stages of process or manufacture, are spaced to contain, say, three sets of loaded drums 112, take up drums 113 and return wheels 114, each set separated by upright dividing plates 115. Sufficient space between the upright frames is left to enable the three sets of drums and wheels to be indexed sideways as shown in interrupted lines on FIGS. 11 and 13. Articles are transferred to a reservoir belt at point 116.

When a loaded reservoir drum is fully wound and incapable of taking in any more articles or, conversely, when drums are fully unloaded and articles are still available in one or both of the other storage drums, all three sets of drums and wheels are indexed laterally by pusher rods 117 passing through the side frames. The three sets of loaded take up drums and pick up wheels, reservoir belts and ancillary equipment are mounted on three composite shafts also mounted on the side frames. Each of these shafts consist of a rotating inner drive shaft 118 and outer bearings 119. The bearings 119 are static and affixed to the side frames. Splined gears, or wheels, or electro-magnetic couplings 110 are fitted at the mid-point of the drive shafts 118 which rotate one set of loaded drum, take up drum and pick up wheel. The bores of all the drums and wheels are also splined, or contain magnetic couplings. By these means only the drums and wheel of the set in action rotate, the other two sets remaining idle. Actuating mechanisms (not shown) are fitted to pusher rods 117, causing them to traverse, thus indexing all three sets of drums and wheels at the same time. The drive shafts 118 are rotated by reversible and variable speed drive motors actuated, or controlled, by sensors arranged at point 116 at direct-link conveyor level or combinations thereof. The transfer of articles at point 116 is momentarily interrupted when change overs take place. To facilitate the change over action, a portion of each belt 15 at the end thereof is smooth on both sides whereby during lateral translation the articles sustain no damage which could otherwise result if dividers were present, and additional stationary or movable fingers, plates or wheels and conveyor belts may be arranged at this point 116.

The arrangement illustrated in FIGS. 15 and 16 is based on the same principle of winding a cigarette reservoir belt round a loaded conveyor drum and a take up drum.

Whereas the earlier described arrangements have two single spaced apart drums, the modification of FIGS. 15 and 16 has a flexible or linked track or band extending between two drums. The flexible track 131 is supported by a fixed plate 132 and a movable support plate 135 which rises and falls as necessary. The track is driven by a sprocket wheel 134 and passes around an idler sprocket 136. The extreme end of the reservoir belt is attached to the track at a shoulder 135. The empty reservoir is wound round a similar pair of sprockets 136 also carrying a track similar to 131. This second set of sprockets and track may be arranged at the side of the loaded reservoir drums and track as illustrated in FIG. 16 or on top. Empty, or take up drums of the example shown in FIG. 1 may also be arranged alongside take up drums in order to reduce the total height of the system.

Alternatively the tracks could be arranged one above the other.

The bulk buffer storage arrangement shown in FIG. 17 is arranged in the region of a packer hopper 140. A delivery conveyor band 141 passes over a pulley 142 which is mounted for horizontal movement towards and away from a reservoir belt 15. As described above, the latter can be stowed on a drum 11 and can be withdrawn therefrom when buffer storage is required. The storage is effected by winding the reservoir belt 15 around a take-up drum 13.

To accommodate the change in length of the conveyor 141, a loop passing around idler pulleys 146, 147 and 148 is provided.

If the packer stops the pulley 142 traverses to the right to cut off the feed to the hopper and instead deliver the product to the reservoir belt. On start up the pulley 142 retracts to the left. If the maker stops then the reservoir belt reverses and feeds the buffered product to the hopper.

While the above descriptions portray systems placed above points between two stages of process, reservoir drums may be positioned below direct link conveyors and/or at unlimited distances and the runs of the reservoir belt itself may follow an infinite variety of routes. By using reservoir belts capable of being articulated in more than one direction they may be arranged to turn at right angles, thus enabling drums to be mounted at right angles to each other or face to face.

I claim:

1. A buffer storage apparatus for receiving a product normally carried by a product conveyor along a path from one location to another, comprising: an elongated reservoir belt movable in the direction of its elongation from a stowed position, past a predetermined region to receive the product and thereafter to a product storage position; a pair of wheels around which the elongate reservoir passes and between which there exists a linear transfer region which is arranged to align with the forward feed product path of the product conveyor during buffer storage demand; pusher means at said transfer region for moving the product laterally in relation to said reservoir belt to transfer the product from the conveyor to the reservoir belt during buffer storage demand; levers to support said pair of wheels and to shift said wheels from said transfer region to a return region so that the linear transfer region of the belt is aligned with a return run of the conveyor; and further pusher means for moving said product laterally from the linear transfer region of said reservoir belt to said conveyor.

2. A buffer storage apparatus for receiving a product normally carried by a horizontally disposed conveyor belt from one location to a hopper of a packer at another location, comprising: an elongated reservoir belt movable in the direction of its elongation from a stowed position, past a region behind the hopper to receive the product, and thereafter to a product storage position; and a roller for supporting one end of the conveyor belt, said roller being movable in the horizontal direction towards and away from said reservoir belt so that on buffer storage demand the conveyor belt extends beyond the hopper to deliver the product to the reservoir belt.

3. A buffer storage apparatus for receiving rod-like articles used in the smokers' industry as said rod-like articles are travelling along a path of travel from one location to another location when buffer storage is required, and for returning said rod-like articles to the said path of travel when said buffer storage is no longer required, comprising:

(a) an elongated reservoir belt having dividers that define pockets, each pocket accommodating a single rod-like article arranged with its longitudinal axis disposed transversally to the longitudinal extension of said reservoir belt, each divider having a height which is at least equal to the diameter of the rod-like article accommodated in each pocket so that the articles in the pockets will not be crushed when the reservoir belt is wound upon itself;

(b) a first core around which said reservoir belt can be wound to stow said reservoir belt when its pockets are empty, said reservoir belt being unwound from said first core when buffer storage is required and being re-wound when the rod-like articles are returned to the path of travel;

(c) a second core around which said reservoir belt can be wound to stow said reservoir belt when its pockets accommodate the rod-like articles, said reservoir belt being wound onto said second core when buffer storage is required and being unwound when the rod-like articles are returned to the path of travel; and (d) means for transferring the rod-like articles between the path of travel and the reservoir belt without disturbing their axial orientations, so that the axis of a rod-like article after its transfer to the reservoir belt remains substantially parallel to its axis while on the path of travel and so that the axis of a rod-like article after its transfer to the path of travel remains substantially parallel to its axis while in a pocket of the reservoir belt, said means including a pick-up drum positioned adjacent to said path of travel; a belt return wheel disposed at a transfer region adjacent said pick-up drum, a portion of said reservoir belt that extends between said first core and said second core being looped about said return wheel; and a return drum positioned adjacent to said pick-up drum so that the pick-up drum feeds the return drum when the reservoir belt reverses directions and the rod-like articles are returned to the path of travel, wherein the rotational axes of said first core, said second core, said pick-up drum, said return drum, and said belt return wheel are parellel to each other and to the longitudinal axes of the rod-like articles at the points of the travel path where the rod-like articles are picked-up for storage and returned for supply.

4. A buffer storage apparatus according to claim 3, wherein the first core, second core, and means for transferring are disposed relative to each other so that the ends of the rod-like articles are always contained within two imaginary parallel planes that are perpendicular to the longitudinal axes of said rod-like articles.

5. A buffer storage apparatus according to claim 4, wherein said first core is disposed at a side of said second core.

6. A buffer storage apparatus according to claim 5, wherein the rotational axis of said first core and the rotational axis of said second core are co-axial.

7. A buffer storage apparatus according to claim 5, wherein the reservoir belt comprises one of a flexible and linked belt.

* * * * *